(12) United States Patent
Davis

(10) Patent No.: US 10,799,808 B2
(45) Date of Patent: Oct. 13, 2020

(54) INTERACTIVE STORYTELLING KIT

(71) Applicant: Nina Davis, Bonifay, FL (US)

(72) Inventor: Nina Davis, Bonifay, FL (US)

(*) Notice: Subject to any disclaimer, the term of this patent is extended or adjusted under 35 U.S.C. 154(b) by 0 days.

(21) Appl. No.: 16/558,584

(22) Filed: Sep. 3, 2019

(65) Prior Publication Data
US 2020/0086226 A1   Mar. 19, 2020

Related U.S. Application Data

(60) Provisional application No. 62/730,637, filed on Sep. 13, 2018.

(51) Int. Cl.
  A63H 33/38   (2006.01)
  G09B 19/00   (2006.01)
  G09B 1/00    (2006.01)
  G09B 5/06    (2006.01)

(52) U.S. Cl.
  CPC .............. *A63H 33/38* (2013.01); *G09B 1/00* (2013.01); *G09B 5/062* (2013.01)

(58) Field of Classification Search
  CPC ........ A63H 33/00; A63H 33/38; A63H 3/005; G09B 19/00; G09B 5/062; A47G 33/00
  USPC .................. 446/71, 72, 73, 75, 81, 147, 297
  See application file for complete search history.

(56) References Cited

U.S. PATENT DOCUMENTS

| | | | | |
|---|---|---|---|---|
| 1,490,295 A | * | 4/1924 | Stephens | A63H 33/38 434/178 |
| 2,914,871 A | * | 12/1959 | Smith | G09D 3/00 40/107 |
| 3,940,863 A | * | 3/1976 | Kritzberg | A63F 1/04 434/236 |
| 4,684,135 A | * | 8/1987 | Bouchal | A63F 3/00 273/148 A |
| 4,807,538 A | * | 2/1989 | Hoffman | A63H 33/00 108/25 |
| 4,853,994 A | * | 8/1989 | Ekstein | A47G 9/1045 5/639 |
| 5,389,028 A | * | 2/1995 | Cabrera | A47G 33/00 446/327 |
| 5,435,726 A | * | 7/1995 | Taylor | A63F 3/04 273/263 |
| 5,749,764 A | * | 5/1998 | Bailey | A63H 3/005 446/302 |
| 5,980,354 A | * | 11/1999 | Prest | A63H 33/38 434/171 |

(Continued)

*Primary Examiner* — Alexander R Niconovich
(74) *Attorney, Agent, or Firm* — Boudwin Intellectual Property; Daniel Boudwin

(57) ABSTRACT

An interactive storytelling kit. The interactive storytelling kit has a story source material and a main container. The main container includes a base, at least one sidewall, and a removably securable lid, thereby defining a main container interior volume. A plurality of small containers fit inside the main container's interior volume. The plurality of small containers each include a base, at least one sidewall, and a removably securable small container lid, thereby defining a small container interior volume. The small container lid has indicia disposed on an external surface. Storytelling aids fit inside the small containers interior volume. In use an individual reads a story from the source material and opens corresponding small containers at defined key points in the story to reveal storytelling aids that aid in engaging an audience with the story.

19 Claims, 3 Drawing Sheets

(56) References Cited

U.S. PATENT DOCUMENTS

| | | | | |
|---|---|---|---|---|
| 6,053,792 A * | 4/2000 | Sallee | A47G 33/00 135/87 |
| 6,193,579 B1 * | 2/2001 | Mak | A63H 3/003 40/455 |
| 6,210,172 B1 * | 4/2001 | Clements | B42D 1/00 281/15.1 |
| 6,244,439 B1 * | 6/2001 | Dennis | A63H 3/50 206/457 |
| 6,434,769 B1 * | 8/2002 | Koenig | A47D 15/00 446/369 |
| 6,540,579 B1 * | 4/2003 | Gubitosi | A63H 33/00 297/118 |
| 6,663,456 B2 * | 12/2003 | Gemma, Jr. | A63H 3/08 446/147 |
| 6,722,084 B2 * | 4/2004 | Berman | E04H 15/006 135/120.1 |
| 7,056,183 B2 * | 6/2006 | Pedoto | A47B 83/00 312/305 |
| 7,211,305 B2 * | 5/2007 | Steiger | A41G 1/001 283/100 |
| 7,320,467 B2 * | 1/2008 | Matilla | A63F 3/04 273/273 |
| 7,494,127 B2 * | 2/2009 | Schmidt | A63F 1/00 273/299 |
| 7,513,502 B1 * | 4/2009 | Nygren | A63F 1/04 273/138.1 |
| 8,615,830 B2 * | 12/2013 | McQuoid | A47G 9/1045 5/639 |
| 9,171,480 B2 * | 10/2015 | Olsen | G09B 19/00 |
| 9,844,967 B1 * | 12/2017 | Orr | B42D 5/047 |
| 10,053,274 B1 * | 8/2018 | O'Neill | B65D 5/4291 |
| 10,062,305 B1 * | 8/2018 | Orr | G09D 3/02 |
| 10,272,348 B2 * | 4/2019 | Brant | A63H 3/005 |
| 10,464,715 B1 * | 11/2019 | DeJesus | B65D 1/40 |
| 2001/0031449 A1 * | 10/2001 | Zwiers | G09B 23/28 434/127 |
| 2005/0202386 A1 * | 9/2005 | Clements | G09B 5/062 434/317 |
| 2005/0281028 A1 * | 12/2005 | Orsini | G09B 1/00 362/234 |
| 2006/0240736 A1 * | 10/2006 | Lewis | A63H 3/00 446/73 |
| 2009/0007467 A1 * | 1/2009 | Bowman | G09D 3/04 40/107 |
| 2009/0246742 A1 * | 10/2009 | Nadan | A63H 33/38 434/128 |
| 2016/0063875 A1 * | 3/2016 | Javidan | G09B 5/065 434/317 |
| 2016/0063876 A1 * | 3/2016 | Javidan | A63H 33/38 434/317 |
| 2019/0269185 A1 * | 9/2019 | Merritt | A41D 10/00 |

* cited by examiner

INTERACTIVE STORYTELLING KIT

CROSS REFERENCE TO RELATED APPLICATIONS

This application claims the benefit of U.S. Provisional Application No. 62/730,637 filed on Sep. 13, 2018. The above identified patent application is herein incorporated by reference in its entirety to provide continuity of disclosure.

BACKGROUND OF THE INVENTION

The present invention relates to storytelling devices. More particularly the present invention provides for a storytelling kit including a story source material, a main container, a plurality of small containers that fit inside the main container, and a plurality of storytelling aides that fit inside the small containers.

Many people enjoy reading stories to children and teaching them about various topics such as religious holidays. However, some children have difficulty paying attention for lengthy or complicated stories. Children with learning disabilities, in particular, may have trouble comprehending complicated stories like the Christmas story due to troubles relating to reading comprehension and lack of an ability to focus on the story material which stems from their learning disabilities. Some children become bored when the story is solely read out loud. Many children respond better, become more involved with the story, and learn the morals and lessons of the story when it is accompanied by an interactive component. Therefore, an interactive storytelling kit that engages the user's audience while the user tells a story, thereby enhancing the audience's learning and retention of the material is desired.

Devices have been disclosed in the known art that relate to storytelling. These include devices that have been patented and disclosed in patent application publications. However, the devices in the known art have several drawbacks. Some such devices do not provide a structured and consistent story and message to be taught. Other storytelling devices present game cards with pictures or words associated with the story, but do not provide a three-dimensional tactile experience, or auditory experience, to go with associated parts of the story. Still other storytelling devices do not incorporate an interactive component into the story source material, and instead rely on the audience being in very close proximity to the storyteller source material. In such cases, the storyteller must juggle making the source material viewable to the audience while still being able to read the story. These devices do not allow for the audience to interact with the story elements an examine them at their leisure, as well as altering their orientation or playing with them while the story is being read.

The present invention substantially diverges in design elements from the known art and consequently it is clear that there is a need in the art for an improvement to existing storytelling devices. In this regard the present invention substantially fulfills these needs.

SUMMARY OF THE INVENTION

In view of the foregoing disadvantages inherent in the known types of storytelling devices now present in the prior art, the present invention provides an interactive storytelling kit wherein the same can be utilized by the user to engage and teach a story to an audience. The interactive storytelling kit has a story source material and a main container. The main container includes a base, at least one sidewall, and a removably securable lid, thereby defining a rain container interior volume. A plurality of small containers fit inside the main container's interior volume. The plurality of small containers each include a base, at least one sidewall, and a removably securable small container lid, thereby defining a small container interior volume. The small container lid has indicia disposed on an external surface. Storytelling aids fit inside the small containers' interior volume. In use, an individual reads a story from the source material and opens corresponding small containers to reveal storytelling aids at key points in the story.

Other objects, features and advantages of the present invention will become apparent from the following detailed description taken in conjunction with the accompanying drawings.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
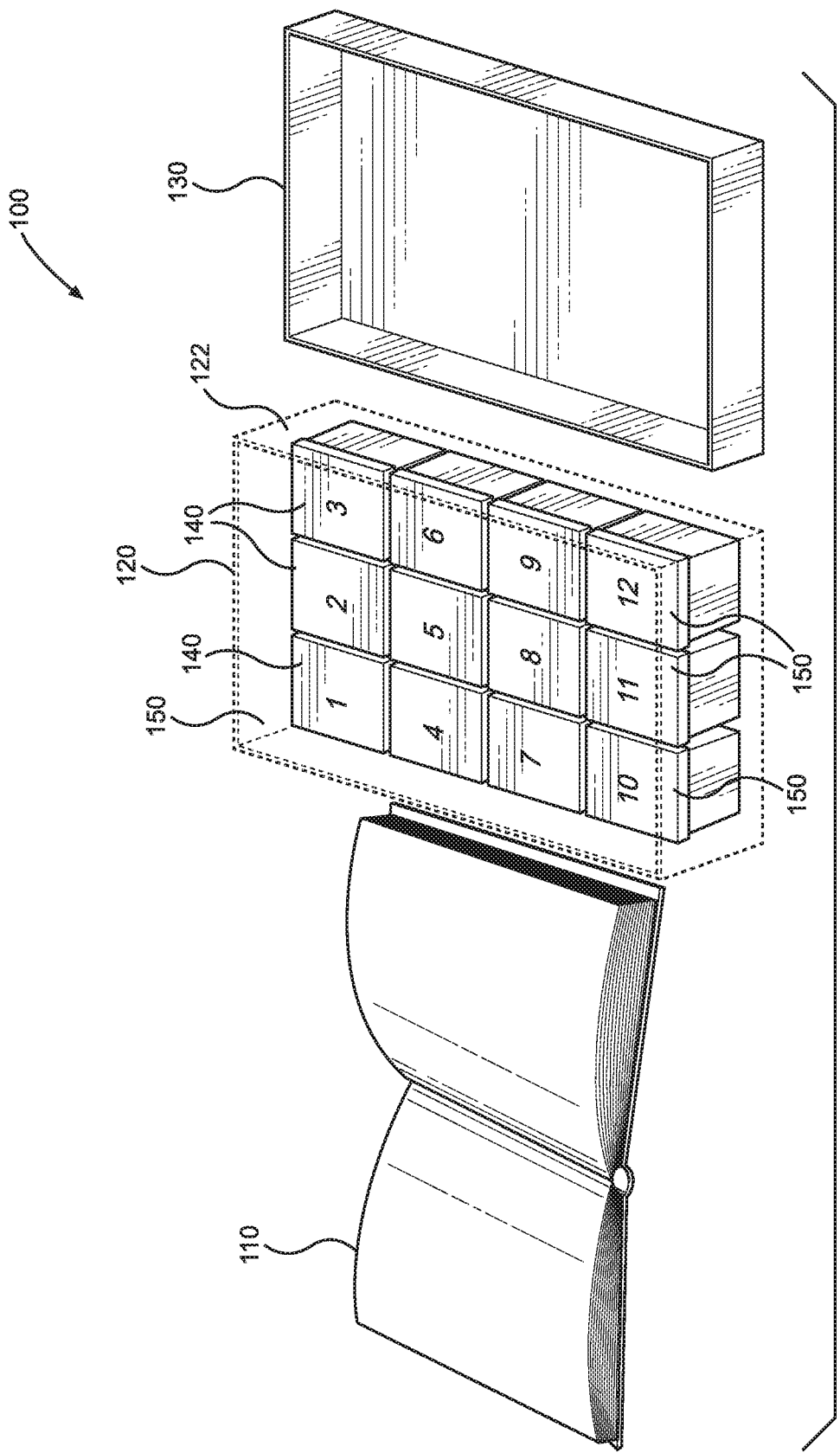
FIG. 1 shows a perspective view of an embodiment of the interactive storytelling kit.

Reference is made herein to the attached drawings. Like reference numerals are used throughout the drawings to depict like or similar elements of the interactive storytelling kit. For the purposes of presenting a brief and clear description of the present invention, a preferred embodiment will be discussed as used for the interactive storytelling kit. The figures are intended for representative purposes only and should not be considered to be limiting in any respect.

Referring now to FIG. 1, there is shown a perspective view of an embodiment of the interactive storytelling kit. The interactive storytelling kit 100 comprises a story source material 110, a main container 120, a removably securable main container lid 130, a plurality of small containers 140, a removably securable small container lid 150 for each small container 140, and a plurality of storytelling aids (as shown in FIG. 2).

The story source material 110 is a narrative of a topic intended for an audience. In various embodiments, the narrative is a story about a religious holiday such as Christmas. One of ordinary skill in the art will understand that in various embodiments the story is a fictitious story and a non-fictitious story. In the shown embodiment, the story source material 110 is a story about Christmas told in simplified Bible verses. In the shown embodiment, the story source material 110 is a book. In one embodiment, the story source material 110 further incorporates imagery and pictures. In a further embodiment, the story source materials 110 incorporates depictions of a plurality of storytelling aids. In another embodiment, the story source material 110 incorporates highlighting and colored text to differentiate key points in the story from the remainder of the text.

The main container 120 includes a base, at least one sidewall 122 and a removably securable main container lid 130, thereby defining a main container interior volume 150. The main container interior volume is configured to receive a plurality of small containers 140. In the shown embodiment, the main container interior volume is configured to receive twelve small containers 140. In the shown embodiment, the story source material 110 has 12 key points defined in the story. Each key point corresponds to a small container 140. In such an embodiment, when the story reaches a specific key point, the user is directed to interact with the corresponding small container 140. In various embodiments, the direction is provided by a highlighted text, a colored text, a word played by the speaker, and a tone played by the speaker. In such a manner, an audience interacts with the interactive storytelling kit 100 and experiences a deeper involvement in the story.

Figure 2:
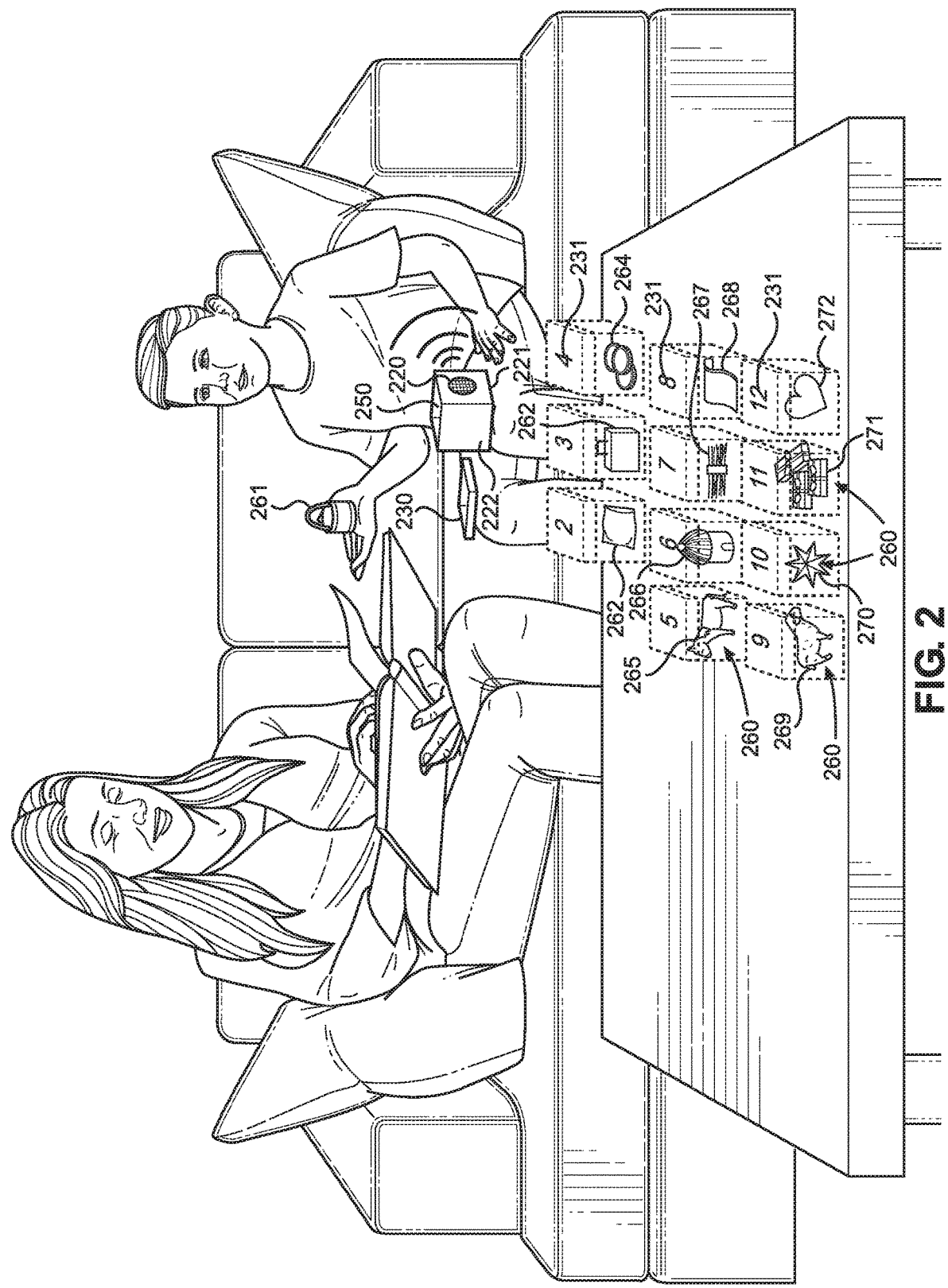
FIG. 2 shows a perspective view of an embodiment of the interactive storytelling kit, in use.

Referring now to FIG. 2, there is shown a perspective view of an embodiment of the interactive storytelling kit, in use. The plurality of small containers each includes a base 221, at least one sidewall 222, and a removably securable small container lid 230, thereby defining a small container interior volume 250. In some embodiments, the small container lid 230 further comprises indicia 231 disposed on an external surface of the small container lid 230, the use of which a user is able to determine which small container to interact with at key points defined in the story. In one embodiment, the indicia 231 further comprise a number in the range of 1 through 12. In such an embodiment, the user is able to determine the order in which to arrange and open the small containers when outside of the main container. In another embodiment, the indicia 231 further comprise a depiction of the storytelling aid 260 stored in the small container, as detailed below. In such an embodiment, the user is able to determine which storytelling aid 260 belongs in which small container, which provides for visual cues on which storytelling aids are utilized in the story, as well as easier cleanup and setup of the interactive storytelling kit after the story is over, or prior to use.

Each small container interior volume 250 is configured to receive a storytelling aid 260. In some embodiments, the storytelling aids 260 provide the audience with a tangible item to interact with, that has direct relevance to the story, and specifically corresponds to key points in the story, as further detailed below. In the shown embodiment, the storytelling aids 260 are toys that represent a pail 261, a pillow 262, a suitcase 263, at least one coin 264, a donkey 265, an inn 266, a bundle of straw 267, a piece of linen cloth 268, a sheep 269, a star 270, at least one gift box 271, and a heart 272. In other embodiments, the storytelling aids 260 further include toys that represent a male figurine, female figurine, a baby figurine, an angel figurine, a plurality of wisemen figurines, a shepherd figurine, a scroll, a stable, a manger, and at least one vial.

In one embodiment, the interactive storytelling kit further comprises a speaker 220 in order to incorporate an audio element to the story separate from a storyteller's voice. In various further embodiments, the speaker 220 is in operable communication with a small container and/or the main container. In such embodiments, the speaker 220 is in operable communication with an audio recording stored in a non-transitory computer readable medium. In variations on such an embodiment, the story source material, or a portion thereof, is stored as an audio recording in the non-transitory computer readable medium. In various embodiments, the speaker plays the story source material, and portions thereof, wherein the story source material is stored as an audio recording in the non-transitory computer readable medium. In some embodiments, the speaker is activated and the story source material, and portions thereof, are played when the corresponding container is opened. In other embodiments, the speaker is activated, and the story source material, or portions thereof, are played upon actuation of a switch disposed on the sidewall of the container. One of ordinary skill in the art will understand that a variety of sensors and switches are contemplated by this disclosure and may be used on various surfaces of the small container and/or the main container to activate the speaker.

Figure 3:
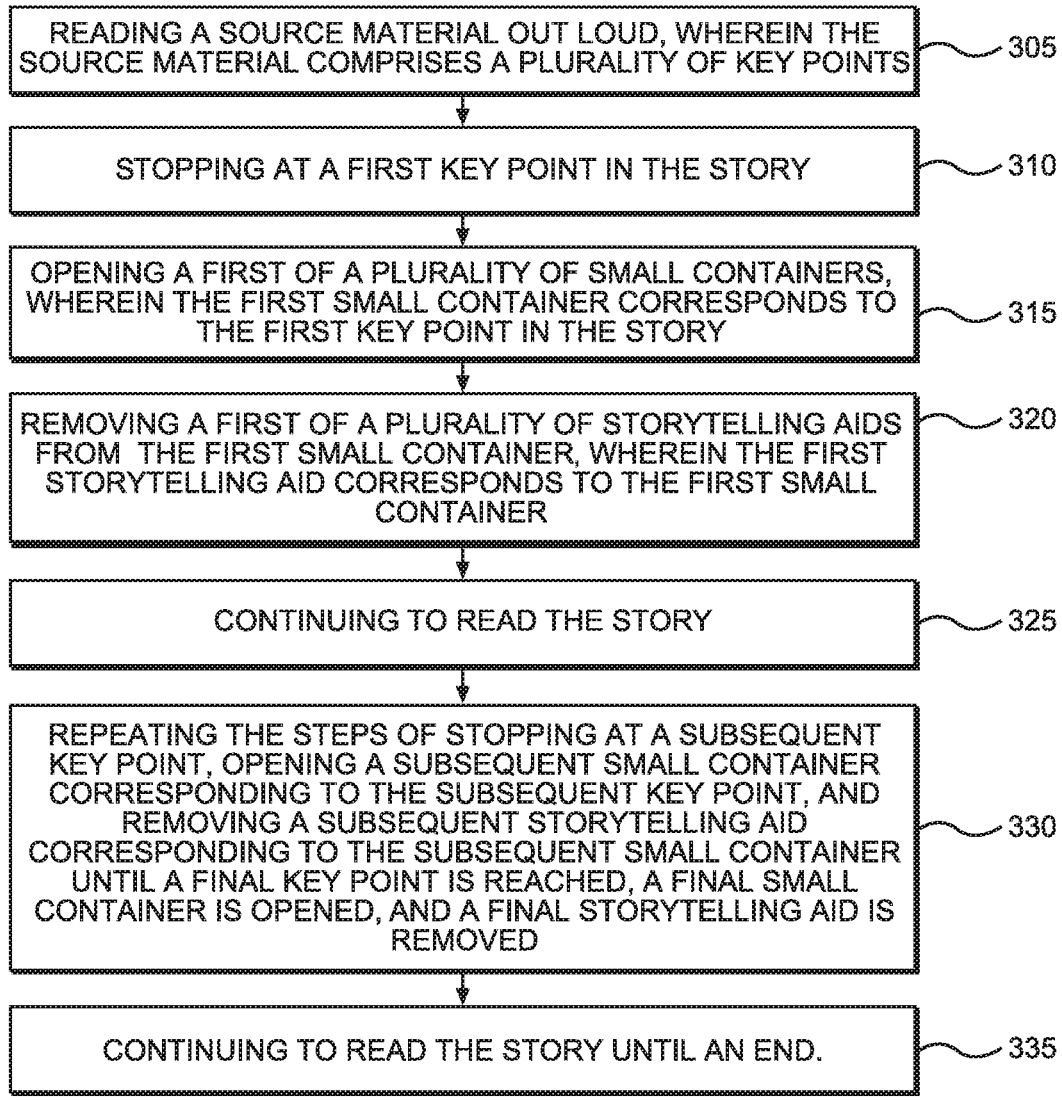
FIG. 3 shows a flowchart of the method of telling a story utilizing an embodiment of the interactive storytelling kit.

Referring now to FIG. 3, there is shown a method of telling a story utilizing an embodiment of the interactive storytelling kit. In use, an individual removes the main container lid from the main container, thereby revealing the plurality of small containers stored therein. In some embodiments, the story source material, in the form of a book and a recording stored on a non-transitory computer readable medium, is stored in the interior volume of the main container. The user continues to utilize the interactive storytelling kit by retrieving the story source material and causing the story source material to be read out loud, wherein the source material comprises a plurality of key points 305. In various embodiments, the story source material is read out loud via a speaker in operable connection with a recorded audio stored in a non-transitory computer readable medium.

The user continues to read the story source material until directed to stop at a first key point in the story 310. In some embodiments, the direction is in the form of highlighted and colored words in the written story source material. In other embodiments, the direction is in the form of a spoken word and audio tone played by the speaker. At the direction to stop at a first key point in the story, the user stops reading, and an audience member opens a first of a plurality of small containers, wherein the first small container corresponds to the first key point in the story 315. The audience member then removes a first of a plurality of storytelling aids from the first small container, wherein the first storytelling aid corresponds to the first small container 320. At this point the audience member is able to interact and examine the first storytelling aid and contemplate how it fits in the story. The user then continues to read the story 325. The user and audience repeat the steps of stopping at a subsequent key point, opening a subsequent small container corresponding to the subsequent key point, and removing a subsequent storytelling aid corresponding to the subsequent small container 330. For example, a user continues to read until directed to stop at a second key point in the story. At the direction to stop at a second key point in the story, the user stops reading, and the audience member opens a second small container corresponding to the second key point in the story. The audience member then removes a second storytelling aid from the second small container. At this point the audience member is able to interact and examine the second storytelling aid and contemplate how it fits in the story.

Such a cycle of reading a story source material out loud, stopping at the next consecutive key point in the story, opening the next consecutive small container corresponding to the next consecutive key point, removing the next consecutive storytelling aid from the next consecutive small container, and continuing to read the story continues until the end of the story is read 335. In one embodiment, the story contains twelve key points. In such an embodiment, the audience member progresses through the cycle of reading the story, stopping at key points, and opening small containers that correspond to the key points until the twelfth small container corresponding to the twelfth key point in the story. The audience member then reeves a twelfth storytelling aid from the twelfth small container, at which point all of the small boxes have been opened. Upon opening the last consecutive small container corresponding to the last consecutive key point and removing the last consecutive storytelling aid from the last consecutive small container, the user continues to read the story until the end.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An interactive storytelling kit, comprising:
   a story source material;
   a main container, including a base, at least one sidewall, and a removably securable main container lid, thereby defining a main container interior volume;
   the main container interior volume configured to receive a plurality of removably securable small containers;
   the plurality of small containers each including a base, at least one sidewall, and a removably securable small container lid, thereby defining a small container interior volume;
   wherein each of the plurality of small containers further comprise a speaker in operable communication with an audio recording stored on a non-transitory computer readable medium;
   the small container lid further comprising indicia disposed on an external surface; and
   the small container interior volume configured to receive a storytelling aid.

2. The interactive storytelling kit of claim 1, wherein the story source material is a book.

3. The interactive storytelling kit of claim 1, wherein the story source material is an audio recording.

4. The interactive storytelling kit of claim 1, further comprising a speaker in operable communication with the main container and an audio recording stored on a non-transitory computer readable medium.

5. The interactive storytelling kit of claim 1, wherein the indicia further comprise a number in a range of 1 through 12.

6. The interactive storytelling kit of claim 1, wherein the indicia further comprise a depiction of the storytelling aid stored in the small container.

7. The interactive storytelling kit of claim 1, wherein the storytelling aid is a pail, a pillow, a suitcase, at least one coin, a donkey, an inn, a bundle of straw, a piece of linen cloth, a sheep, a star, at least one gift box, and a heart.

8. The interactive storytelling kit of claim 1, wherein the storytelling aid is a pail, a pillow, a suitcase, at least one coin, a donkey, an inn, a bundle of straw, a piece of linen cloth, a sheep, a star, at least one gift box, a heart, a male figurine, a female figurine, a baby figurine, an angel figurine, a plurality of wisemen figurines, a shepherd figurine, a scroll, a stable, a manger, and at least one vial.

9. The interactive storytelling kit of claim 1, wherein the indicia correspond to a key point in the story, wherein the key point is defined by the story source material.

10. The interactive storytelling kit of claim 1, wherein the speaker is activated, and a portion of the story source material is played, when the small container is opened.

11. The interactive storytelling kit of claim 1, further comprising a sensor in communication with the small container lid, whereupon the sensor being actuated by removal of the small container lid, the speaker is activated and a portion of the story source material is played.

12. An interactive storytelling kit, comprising:
    a story source material;
    a main container, including a base, at least one sidewall, and a removably securable main container lid, thereby defining a main container interior volume;
    the main container interior volume configured to receive 12 removably securable small containers;
    the 12 small containers each including a base, at least one sidewall, and a removably securable small container lid, thereby defining a small container interior volume;
    wherein each of the plurality of small containers further comprise a speaker in operable communication with an audio recording stored on a non-transitory computer readable medium;
    the small container lid further comprising indicia disposed on an external surface; and
    the small container interior volume configured to receive a storytelling aid.

13. The interactive storytelling kit of claim 12, wherein the story source material is a book.

14. The interactive storytelling kit of claim 12, wherein the story source material is an audio recording.

15. The interactive storytelling kit of claim 12, further comprising a speaker in operable communication with the main container and an audio recording stored on a non-transitory computer readable medium.

16. The interactive storytelling kit of claim 12, wherein the indicia further comprise a number in a range of 1 through 12.

17. The interactive storytelling kit of claim 12, wherein the indicia further comprise a depiction of the storytelling aid stored in the small container.

18. The interactive storytelling kit of claim 12, wherein the storytelling aid is selected from the group consisting of: a pail, a pillow, a suitcase, at least one coin, a donkey, an inn, a bundle of straw, a piece of linen cloth, a sheep, a star, at least one gift box, and a heart.

19. The interactive storytelling kit of claim 12, wherein the storytelling aid is selected from the group consisting of: a pail, a pillow, a suitcase, at least one coin, a donkey, an inn, a bundle of straw, a piece of linen cloth, a sheep, a star, at least one gift box, a heart, a male figurine, a female figurine, a baby figurine, an angel figurine, a plurality of wisemen figurines, a shepherd figurine, a scroll, a stable, a manger, and at least one vial.

* * * * *